UNITED STATES PATENT OFFICE.

DEMPSTER M. SMITH, OF WASHINGTON, DISTRICT OF COLUMBIA.

CHANGE-SPEED GEARING.

983,864.

Specification of Letters Patent.

Patented Feb. 7, 1911.

Application filed April 27, 1907. Serial No. 370,677.

*To all whom it may concern:*

Be it known that I, DEMPSTER M. SMITH, a citizen of the United States, resident of Washington, in the District of Columbia, have invented certain new and useful Improvements in Change-Speed Gearing, of which the following is a specification.

The invention relates to change speed gearing especially adapted for use in automobiles, although it may be used in any other case where similar conditions obtain.

In automobiles having a live rear axle, on the highest speed the motor is, in approved constructions, connected through a single line of shafting with a bevel pinion adjacent to the rear axle and this pinion engages a bevel gear upon the axle which drives the wheels through the customary differential gearing. This is termed a "direct drive" and is, in fact, as direct a connection as can be obtained between the motor and the wheels when the motor shaft is longitudinal of the vehicle, since the power is transferred to the axle through a single set of two contacting gears. It is necessary in addition to this direct connection to provide other connections of the motor with the wheels, by means of which the motor is allowed to run still faster in proportion to the speed of the wheels than is permitted by the ratio of reduction between the bevel pinion and gear referred to. This is usually accomplished by change-speed gearing located somewhere along the transmission line, so that additional reduction devices can be interposed between the motor and the bevel gear set.

Among the objects of my invention are, to provide a sufficient number of different relative speed ratios between the motor and the driven wheels, to connect the motor in direct relation to the wheels at more than one of its speeds (that is without intervention of any gear reduction, except a single set of gears intermediate the motor and the wheels) to provide speed reductions additional to the direct connections mentioned, preferably so that a total of four or more different speeds of the motor in relation to that of the wheels may be obtained, and to so construct and arrange devices which produce these results that they are of reasonable simplicity and size.

Further objects are to provide operating mechanism for effecting the speed changes which is especially applicable to the form of gearing described, although it may be used in connection with other change speed gearing of the selective type.

The accompanying drawing illustrates principally in diagrammatic form exemplifying structures embodying the invention.

Fig. 7ª, a side view of the parts shown in Fig. 7.

Figure 1:
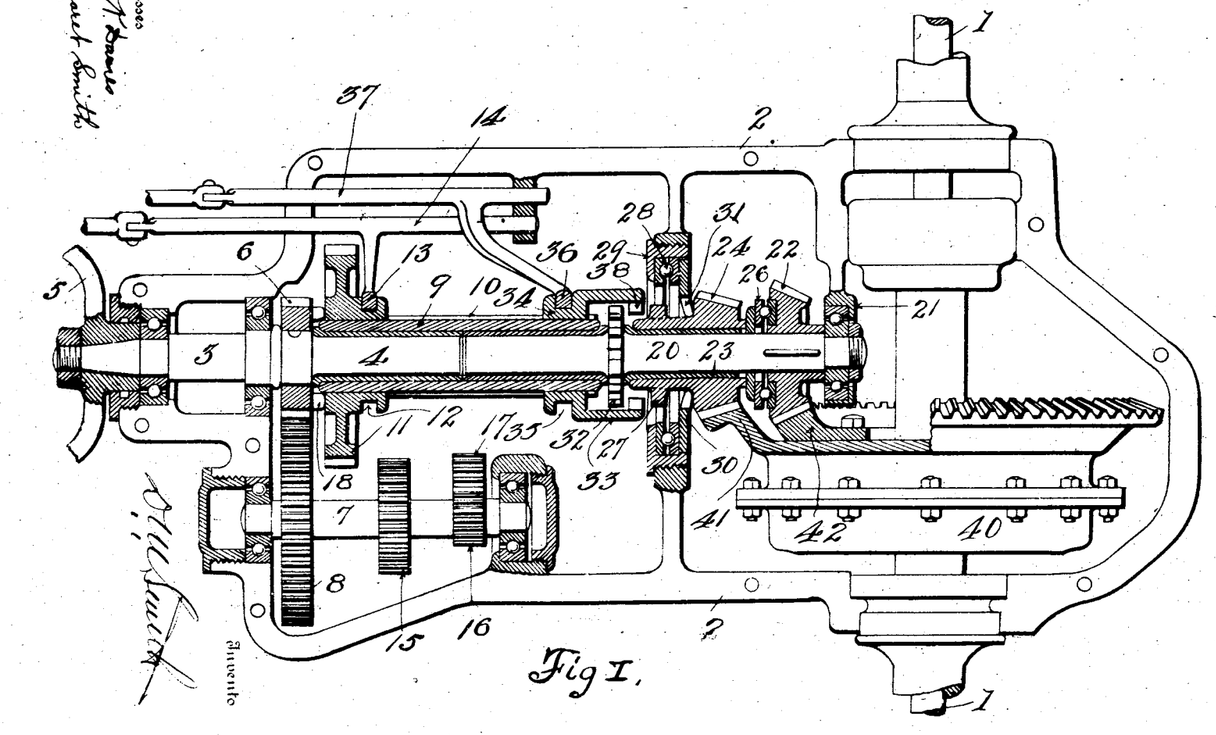
Figure 1 is a horizontal sectional view of the gearing.

Referring to Fig. 1, 1 is the general designation of the rear axle which carries the driving wheels (not shown) and which is to be of any suitable "live axle" construction; this axle is sometimes, referred to as the "final driven member;" 2 a casing inclosing the working parts of the mechanism, conveniently made in two parts and split horizontally, the upper half being removed so as to give a clear view of the mechanism; 3, a primary driving shaft mounted conveniently in ball-bearings (although any other suitable bearings may be used) in the forward end of the casing; 4; the rear end of shaft 3; 5, a representative device by which shaft 3 is connected with the motor; this connection in approved practice is by means of a Cardan shaft; in some cases the shaft 3 may be extended forward and connected with the motor through a single universal joint; 6, a pinion keyed to shaft 3; 7, a countershaft carried in suitable bearings in the casing; as shown it is in the same horizontal plane as shaft 3, but to meet exigencies of design, may be carried below or in other relations to the main driving axis of the gearing; 8 is a gear fast on the countershaft engaging pinion 6; 9, a sleeve revolubly mounted on extension 4 of shaft 3; this sleeve or its equivalent is sometimes called the intermediate driven member; 10, splines on sleeve 9, 11, a sliding gear movable longitudinally on sleeve 9 but compelled to revolve therewith by engagement with splines 10; 12, an annular groove carried by gear 11; 13, a segment engaging the groove; 14, a shifting rod suitably mounted in the casing connected with the segment and serving to shift gear 11 longitudinally on sleeve 9; 15, a gear on countershaft 7 adapted to engage the teeth of the gear 11; 16 is a pinion on the countershaft, 17, a reversing pinion engaging pinion 16 and mounted on a shaft below the countershaft, pinion 17 being so positioned as to engage gear 11 when said gear is moved to its rearmost position; 18, complemental positive clutch jaws carried by pinion 6 and gear 11, respectively.

In the position in which the parts are shown in the drawing clutch jaws 18 on pinion 6 and gear 11 are in engagement and sleeve 9 is, therefore, impelled directly by primary driving shaft 3, and at the same speed. To change the speed of sleeve 9 in relation to that of the driving member, gear 11 is moved to the rear by means of shifter 14, disengaging positive clutches 18 and bringing the teeth of gear 11 into contact with those of gear 15 on the countershaft, which is at all times impelled by pinion 6, engaging gear 8. The sleeve 9 is now driven from the countershaft at a speed considerably less than that of the driving shaft 3, the exact speed depending, of course, upon the proportions of the gears employed. To reverse the direction of movement of sleeve 9 in relation to the driving member, gear 11 is moved farther to the rear out of engagement with gear 15 and into engagement with pinion 17. The countershaft revolves in a direction opposite to that of driving shaft 3, the pinion 17 impelled by pinion 16 on the countershaft revolves in the same direction as shaft 3, and gear 11 when in engagement with pinion 17 revolves in the opposite direction to that of shaft 3. In gearing of the type now being described, which is, in the art, termed "sliding gearing", it is customary to provide a main or "master" clutch between the motor and the gearing, and I intend to use such a clutch in connection with my invention but do not consider it necessary to illustrate it or describe it particularly, as any desired form of clutch may be employed. This clutch is disengaged when the speed ratios are to be changed so that the gearing is not injured by teeth or other positive connecting members coming in contact when impelled with destructive force.

20 is a shaft of which the forward end is revolubly mounted in sleeve 9 and the rear end is revolubly mounted by means of a ball-bearing in a bracket 21 in the casing. 22 is a bevel pinion which I sometimes call a "high speed pinion" keyed to the shaft 20; 23, a sleeve revoluble in relation to shaft 20; 24, a pinion carried by sleeve 23 which I sometimes refer to as a "low speed pinion"; 26, a ball thrust bearing intermediate pinions 22 and 24 and serving to transfer the thrust of the former to the latter; 27, positive clutch members on sleeve 23, preferably shaped similar to a gear so as to provide a considerable number of projections of relatively small width; 28, a ball thrust bearing; 29, an adjustable seat for the bearing screwed into the casing; 30, a ring resting against the rear member of bearing 28 and having inwardly-projecting fingers 31 engaging the forward face of pinion 24, these fingers being shaped so that they may pass between positive clutch members 27 to facilitate the assembling of the parts. Bearing 28 takes up the thrust of pinion 24 directly and indirectly also carries the thrust of pinion 22.

32 are positive clutch members similar to 27 carried by shaft 20; 33 is a sliding clutch member having a hub 34 engaging spline 10 on sleeve 9 so that it is shiftable longitudinally on said sleeve but revolves therewith; 35, an annular groove in hub 34; 36, a segment engaging the groove; and 37, a shifter similar to 14 for moving clutch member 33.

38 are positive clutch teeth on member 33 complemental to clutch devices 27, 32.

40 designates a casing containing differential mechanism of any suitable construction; 41, a bevel gear carried thereby engaging pinion 24 and sometimes referred to as the low-speed bevel gear, and 42, a smaller bevel gear also fixed to the differential casing engaging pinion 22 and sometimes referred to as the high-speed bevel gear.

Clutch member 33 as shown is in neutral position and no power can be transmitted from the driving to the driven members. If it is desired to connect the motor with the wheels at the lowest direct speed, gear 11 is left in the position shown in the drawing and clutch member 33 is moved rearward so that teeth 38 engage teeth 27, connecting pinion 24 revolubly with sleeve 9. The sleeve and pinion 24, therefore, revolve at the same angular speed as the motor, and drive the rear wheels through bevel gear 41 at a single, considerable reduction of speed, depending upon the exact proportions of pinion 24 and gear 41. To connect the motor with the wheels at the highest direct speed, clutch member 33 is moved forward until teeth 38 engage teeth 32. Pinion 24 is then free, but pinion 22 is connected operatively with driving member 3 and impels the wheels at a single reduction of speed through gear 42, this speed being, however, greater than that afforded by pinion 24 and gear 41, owing to the fact that pinion 22 is of greater diameter in relation to that of its gear. It will now be apparent that with clutch 33 in either of its operative positions gear 11 can be shifted so as to connect sleeve 9 with the motor at a reduced speed. Therefore, the gearing so far described affords four forward speeds of the wheels in relation to that of the motor, two of which are "direct" through a single gear reduction and the other two are effected by two reductions.

The speed changes may be effected in different ways. If the direct driving gears are properly proportioned the car may be driven under most circumstances through one of the direct speed combinations, so that the power of the motor is most economically utilized. The efficiency of the motor at either of the direct speeds is practically the same, since it operates through a single set of gears. At the same time, to further increase the speed of rotation of the motor in relation to that of the wheels, gear 11 may be moved to engagement with gear 15 so that sleeve 9 is impelled at a reduced speed and transmits its power to the wheels through either pinion 22 or pinion 24.

It is preferable to arrange the speed ratios so that a certain proportional progression of the speed of the wheels in relation to that of the motor may be obtained. An example of this arrangement is as follows: Ratio reduction of pinion 22 to gear 42, 2 to 1; ratio reduction of pinion 24 to gear 41, 4 to 1; ratio of reduction of pinion 6 to gear 8, 2 to 1; ratio of reduction of gear 15 to gear 11, 2 to 1. The resulting speeds will be, with clutch member 33 in rearward position and gear 11 in engagement with gear 15, sixteen revolutions of the motor to one of the wheels; with clutch member 33 in forward position and gear 11 unmoved, 8 to 1; with gear 11 in forward position and clutch member 33 in rearward position, 4 to 1; with clutch member 33 in forward position and gear 11 unmoved, 2 to 1. The gears may be differently proportioned as desired, for instance, so that the difference in geared speeds from each position to the next shall be equal or approximately so.

The gearing is also adaptable to automobiles of the double chain drive type. In this arrangement shaft 1 instead of constituting a rear axle member is mounted on the frame, and forms a transverse shaft, frequently termed in the art a "jack-shaft", having a sprocket at each end, connected by chains to sprockets on the driving wheels. This arrangement is not so efficient, so far as power transmission is concerned, as the live axle type, but is supposed by some designers to have certain structural advantages, and by its use the connections of the controlling devices (later to be described) with the gearing may be somewhat simplified, since there is no relative movement between the gear box and its controlling devices, when both are mounted on the frame.

To effect the changes of speeds, shifting rods 14, 37 may each be connected to a separate lever placed convenient to the hand of the operator. Since, however, some of the speed changes, as for example, from the second to the third speed would, with two separate operating members, require two distinct actions on the part of the operator, it is desirable to provide a single controlling member capable of effecting all the speed changes. This mechanism will now be described. (See Figs. 2-4.) Reference numeral 50 designates the right hand side of the frame of a motor vehicle to which is connected a tubular bearing member 51, in which is mounted a shaft 52 capable of rotation and longitudinal movement. At its outer end the shaft carries a lever 53. A sleeve 54 having a groove 55 is adjustably secured to the shaft 52 by means of a set screw 56, and depending from this sleeve is an arm 57 which is slotted at its lower end at 58. Another tubular bearing member 59 secured to the frame carries an axle 60 to which is secured at the upper end a fork 61 carrying pins 62 engaging the slot 55. At the lower end axle 60 carries an arm 63 disposed at about right angles to fork 61. The axle, fork and arm constitute in effect a bell crank which moves in accordance with the longitudinal movement of shaft 52. Secured to the frame by suitable means, such as arms 64, is a casing 65 having longitudinal sockets 66, 67, forming guides for squared rods 68, 69, respectively. The rods are secured in the casing by means of a cover 70 secured by suitable means to the casing. This cover is shown in place in Fig. 2 and removed in Fig. 3, to give a clear view of the rods. Rod 68 is provided at its forward end with a pin 71 entering slot 58 in arm 57, and rod 69 is connected by a link 72 with the end of arm 63.

By moving the handle of lever 53 laterally in relation to the vehicle (that is toward and from frame member 50), shaft 52 is moved endwise. Supposing the shaft to be moved in the direction of the arrow, Fig. 3, sleeve 54 is moved in the same direction, and with it, fork 61. Through arm 63 and link 72 rod 69 is thus moved to the left, as seen in the figure. Reverse movement of the lever moves the parts in the reverse direction. In the position shown, the lever is in its extreme outward position in relation to the vehicle and rod 69 consequently in its extreme forward position. During the movements described, shaft 52 has no rotative movement, arm 57 has only a lateral movement and there is consequently no movement imparted to rod 68. If the operating lever is moved forward, i. e., so as to rotate shaft 52 in the direction of the arrow, arm 57 is moved in the opposite direction, and, by contact with pin 71, moves rod 68 in the same direction. Opposite movement of the lever moves the rod in the opposite direction.

Figure 7:
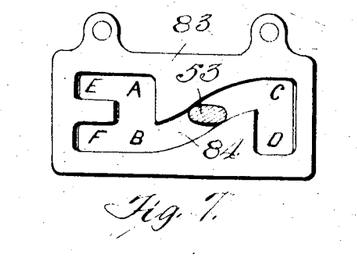
Fig. 7, a view of the guide plate for the controlling lever, the lever being shown in section.
Figure 7A:
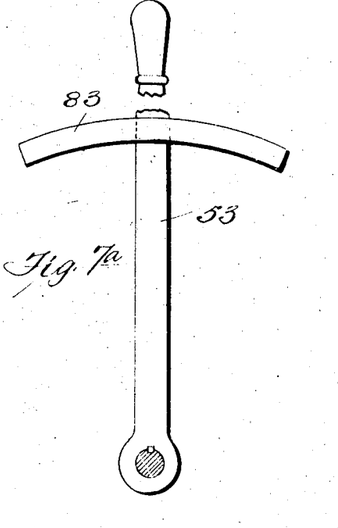

From the foregoing it appears that the controlling lever may be given two distinct movements by the operator—either forward or back, or lateral, and these movements may be made separately or simultaneously. Rods 68 and 69 are connected, respectively, with shifting rods 14 and 37 of the gearing by suitable means so that their movement is imparted to the gear changing members. These connections should in a logical system of control be such that forward movement of the controlling lever effects increases in the gear speed of the vehicle and rearward movement effects decreases in speed. The effect of the lateral movement of the lever is of not so much consequence but I prefer to arrange the parts so that movement of the lever to the right (considering the position of the operator in the car) or away from the vehicle, serves to increase the geared speed, and movement to the left or toward the car tends to decrease the speed. By the arrangements of parts shown in Fig. 3, when the lever is moved forward, rod 68 moves to the rear and when the lever is moved outward, rod 69 moves to the rear. The arrangement of the gearing as seen in Fig. 1 is such that movement of either of the shifting rods 14, 37, toward the front of the car serves to increase the speed. Any suitable connections between the controlling mechanism and the gear therefor, which reverses the movement of rods 68 and 59 as conveyed to the rods 14, 37, is satisfactory. For this purpose I provide a rotatable shaft 75 mounted transversely of the vehicle and on this a sleeve 76 revoluble in relation to the shaft. Upwardly extending arms 77, 78, on the shaft and sleeve, respectively, are connected by links 79 and 80 to squared rods 68 and 69; and downwardly extending arms 81 and 82 on the rod and sleeve, respectively, are connected by links 81ª, 82ª to shifting rods 14 and 37, respectively. Thus as the controlling lever is moved forward, shifting rod 14 is moved forward and with it gear 11, serving to increase the geared speed of the vehicle, and as the lever is moved outwardly shifting rod 37 is moved forward and with it clutch member 38 serving to increase the geared speed of the vehicle. Reverse movements decrease the speeds in an obvious manner. In some cases the mechanism described is sufficient to effect the control of the geared speeds. The operator can, by moving the lever to the right and left only, engage either of the direct gear combinations, and in most cases the vehicle can be run with one or the other of these two speeds the greater part of the time. At any time, however, by moving the lever back he can disconnect the direct driving connection and throw in the additional gear reduction, and any of these changes can, if desired, be made simultaneously by moving the lever in a diagonal direction. In cases where it is desired to regulate the sequence of gear changes, a guide plate 83, such as is shown in Fig. 7, may be provided. This plate is secured to the frame of the machine above the pivotal center of the lever, and the lever passes through a slot 84 in the plate. With the lever in the position shown in Fig. 7, the gearing in respect to both of its shifting members is in "neutral" position, that is, clutch member 38 stands midway between clutch members 27 and 32, and sliding gear 11 is in such a position that it does not engage pinion 15 on the countershaft, and that its positive clutch members 18 do not engage those on pinion 16. If the lever is moved in the slot to position B, the second speed is effective. If it is moved to A, the first speed is effective. If it is moved to C, the third speed, and if to D, the fourth speed is made effective. When the lever is at A or B, by moving it farther to the rear to position E or F, respectively, the direction of movement of driven member is reversed at a low or higher speed respectively.

Figure 4:
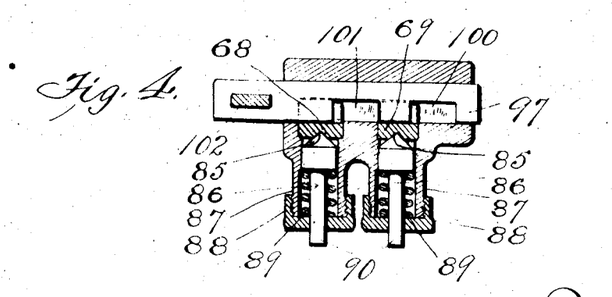
Fig. 4, a cross-section at *a—a*, Fig. 3.

To assist the operator in making the speed changes, it is desirable to provide means for readily locating the points at which the different gear combinations are in proper position. This is conveniently done by providing notches or depressions 85 in rods 68—69, engaged by spring-pressed plungers 86, one for each rod. The notches are conveniently located on the under sides of the rods and the plungers are conveniently carried in projections 87 on the bottom of casing 65. The notches are beveled, and the engaging ends of plungers 86 are, conveniently, conical, as shown in Fig. 4, or at any rate beveled so that they will enter the notches; but when considerable force is exerted tending to move the rods longitudinally the plungers will be forced out of the notches and permit the rods to move. Caps 88 secured on the ends of the plunger housings 87 serve as abutments for springs 89, which bear against the plungers and urge them to engagement with the notches. The plungers are provided with stems 90 passing through central holes in the caps for the purpose of guiding the plungers in addition to their contact with housings 87. A notch 85 is provided in each of rods 68—69 at each of its operative positions. These may be the points of movement of the rods corresponding to the geared speeds only, or in addition notches may be provided on the rods at points corresponding to the different neutral positions of the gearing. When the controlling lever is moved to shift the gear parts, thereby moving rods 68—69, as the notches in each rod come opposite corresponding plungers 85, the plungers enter the notches and tend to restrain the rods from moving to a certain extent, and so give notice to the operator of the points at which the different gear parts are properly engaged for the different speeds, and at which the parts are in the different neutral positions. The plungers and notches may also serve to retain the controlling lever and other parts in whatever position they may be left by the operator, and may be constructed so as to prevent the lever from moving accidentally, as it sometimes tends to do because of jarring when the vehicle is in motion. But in case the spring pressure on the plungers is light, or if for other reasons it is deemed necessary, additional locking devices for the controlling lever may be employed such as notches on its guide plate engaged by a pawl on the lever having suitable releasing means; devices of this nature being well known in the art.

Instead of arranging plungers 86 to operate upon notches in rods 68 and 69, they may be arranged to act on shifting rods 14 and 37 of the gearing proper.

Figure 8:
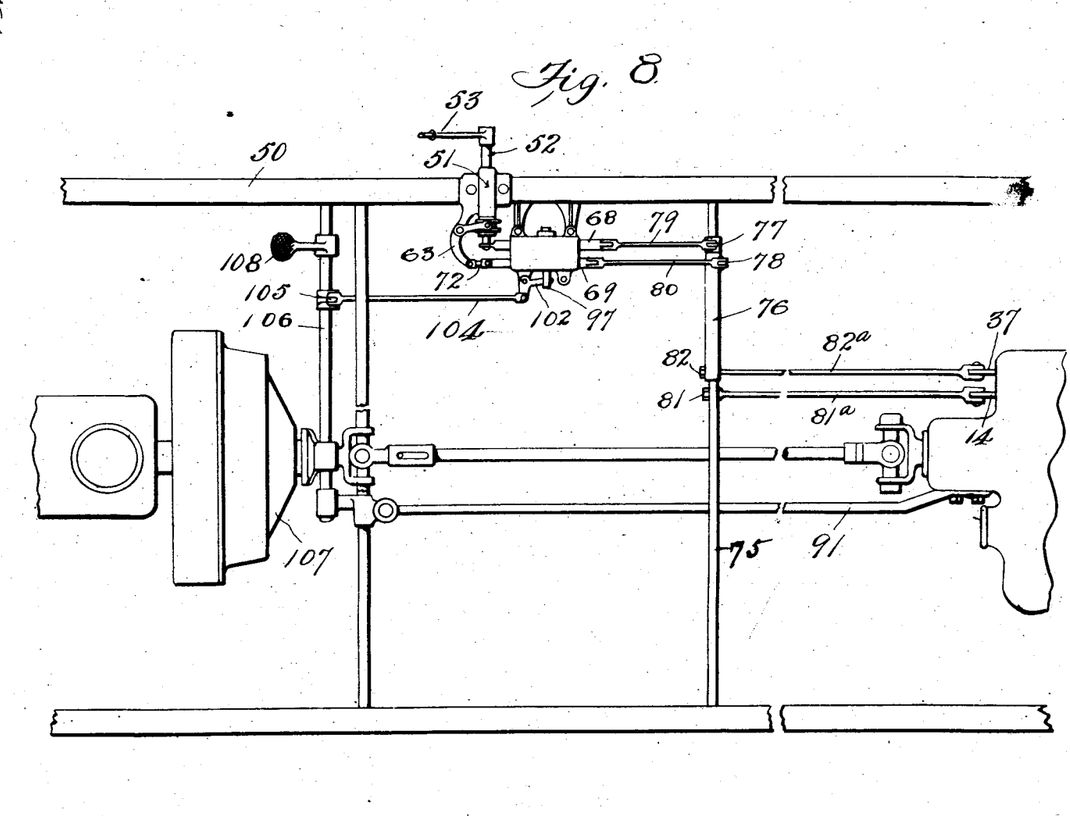
Fig. 8, a plan view of the mechanism assembled in a motor vehicle.

In the arrangement of the parts shown in the drawings the controlling lever and other controlling devices are mounted upon the main frame of the vehicle, while the gearing and other devices connected with the controlling devices first mentioned are carried wholly or partly above the rear axle, which has more or less movement in a substantially vertical direction in relation to the frame (this movement being controlled usually by a radius rod 91, Fig. 8), due to the compression of the springs when the car is in motion. This movement of rods 14 and 37 through a relatively short arc will in most cases impart a slight longitudinal movement to links 81ª, 82ª, rods 68—69, and other parts of the controlling mechanism, if such movement is not prevented by suitable means, or else if the controlling lever and its connected devices are held stationary this movement will result in a similar reciprocatory movement of the shifting rods 14, 37. This movement in most cases is not sufficient to disturb the gear connections since the movement of the positive clutches in engagement at the time is slight in relation to the width of engaging faces of these parts; but if it is desired to prevent any such movement I prefer to apply the spring plungers and notches to the shifting rods 14, 37 of the gearing proper, and in this case the geared parts will be held in engagement without longitudinal movement, and the motion incident to the compression of the vertical springs will occur in the controlling devices exterior to the gearing proper. This will ordinarily be absorbed in the various link connections which are usually necessary, by the flexibility of the connecting links, or in other ways without special provision being made, but if special provision is necessary to accommodate this movement certain of the link connections may be made by means of short slots and pins in the slots, and other positive engaging parts as will be later described, may be provided with a slight play.

Figure 5:
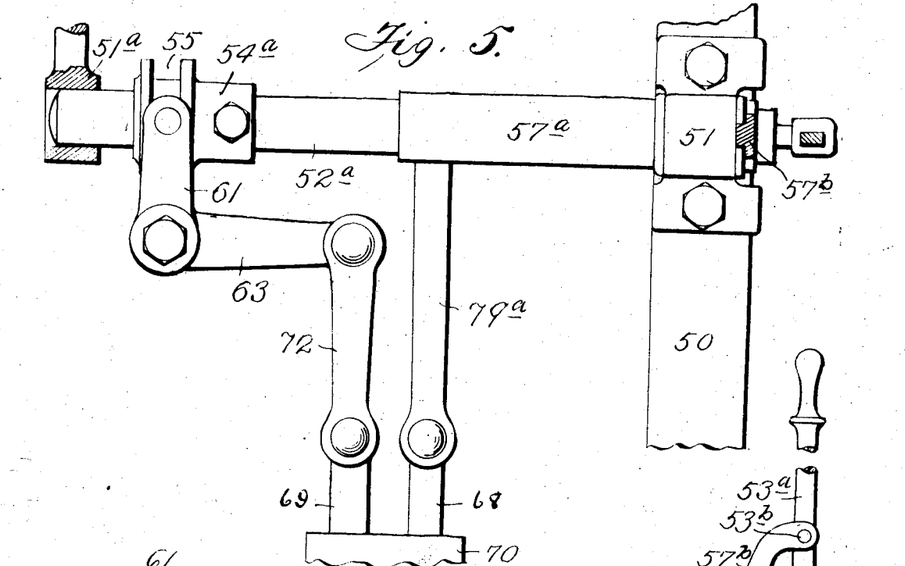
Fig. 5, a plan view of a modified form of operating mechanism.
Figure 6:
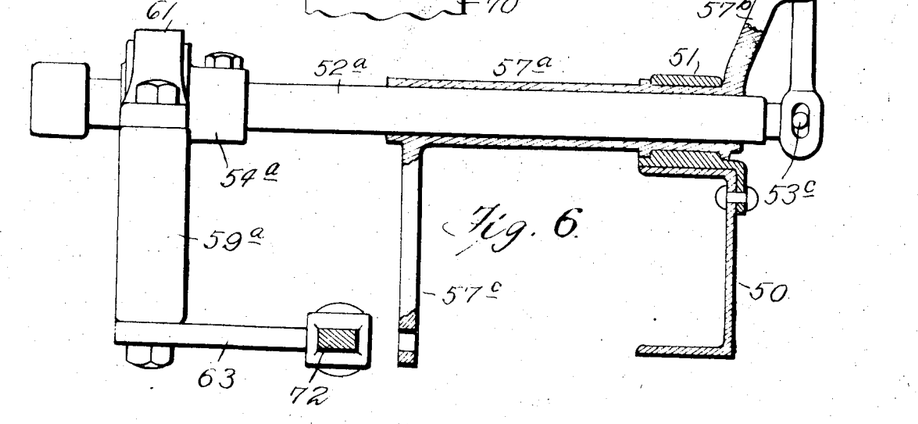
Fig. 6, a view partly in elevation and partly in section of the mechanism of Fig. 5.

Figs. 5 and 6 show the modified form of controlling mechanism for the gearing in which the controlling lever is pivoted for movement in both directions. Shaft 52ª is mounted in a tubular shaft or sleeve 57ª so that it may rotate and move endwise and tubular shaft 57ª in turn is revolubly mounted in bracket 51 but is prevented from moving endwise. Shaft 57ª carries an arm 57ᵇ to which the controlling lever 53ª is pivoted at an intermediate point, and the lower end of the lever is connected to shaft 52ª by a pin and slot connection 53ᶜ. Shaft 57ª also carries another arm 57ᶜ connected to rod 68 by link 79ª. Shaft 52ª carries a grooved collar 55 engaged by a fork 61 which forms one arm of a bellcrank, the other arm 63 of which is connected by a link 72 to the other gear controlling rod 69. The bellcrank is pivotally mounted in a sleeve 59ª secured to any suitable stationary support. The forward or back movement of the controlling lever causes rotation of hollow shaft 57ª and corresponding movement of rod 68 without affecting the position of rod 69. Side movement of the lever causes it to turn on pivot 53ᵇ and move shaft 52ª endwise, causing movement of rod 69 through the bellcrank without affecting the position of rod 68.

Since gearing of the type described requires the use of a master clutch, and since this clutch must be disengaged when the gear changes are made in order to prevent damage to the parts, it is desirable to provide interlocking mechanism intermediate the clutch and gear shifting devices, so that the gear changes may be made only while the clutch is disengaged. I provide this mechanism, and it may serve for this purpose only; but in the preferred construction I also arrange this mechanism so that it provides a positive lock for holding the gear parts in whatever position is desired until another change of gear is to be made.

Figures 2, 3:
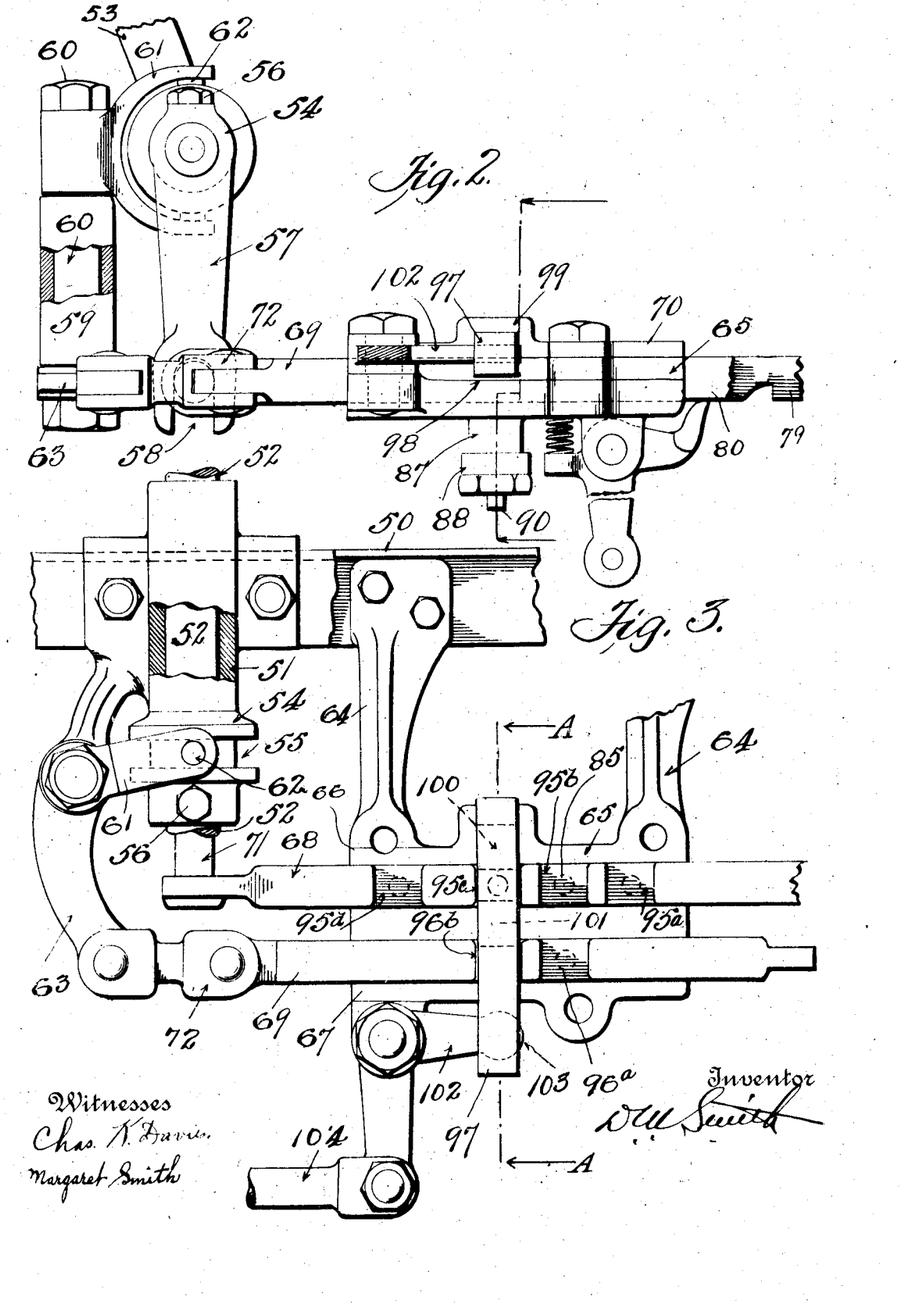
Fig. 2, a left side elevation of the operating mechanism.
Fig. 3 a plan view of Fig. 2.

Referring especially to Figs. 2, 3, 4: Rods 68—69 are provided with a plurality of transverse slots 95ª, 95ᵇ, 95ᶜ, 95ᵈ, and 96ª, 96ᵇ, respectively. Notch 95ª corresponds to the reverse position, 95ᵇ to the first neutral position, 95ᶜ to the lower forward and 95ᵈ to the high forward speed position, respectively, of rod 68; and notches 96ª and 96ᵇ correspond respectively to the lower and higher speed positions of rod 69. At right angles to the rods 68—69 and conveniently above them is mounted a locking bolt 97, which rests in a slot 98 in casing 65, and is further guided by groove 99 in cover 70. When the cover is in place the bolt is secured in the proper position, and removal of the cover permits removal of the bolt or inspection of the bolt in its working relation to adjacent parts. Bolt 97 has slots 100, 101 slightly wider than rods 68, 69. In the position of parts shown in Fig. 3, the bolt is in locking position, with slots 100, 101 out of register with rods 68, 69, and the bolt is in slot 95ᶜ of rod 68 and slot 96ᵇ of rod 69. The rods are therefore in low and high forward speed positions respectively, and are prevented from longitudinal movement of any consequence by engagement with the bolt. For the purpose of providing slight play which may sometimes be necessary, as has already been referred to, and also to facilitate the movement of the locking bolt, there is a slight clearance provided between the edges of the slots in the rods and bolt 97. To permit movement of the rods and shifting of the gears, bolt 97 is moved in the direction of the arrow until its slots 100, 101 register with rods 68, 69, whereupon the rods may be moved longitudinally. Bolt 97 is shifted by a bell crank 102 pivotally mounted on casing 65, of which one end 103 enters a slot or recess in the bolt. The other end of the bell crank is connected by a link 104 with an arm 105 on clutch-controlling shaft 106. 107 designates any suitable clutch for connecting the driving member of the gearing with the motor. A pedal 108 or other suitable device is provided by which the operator may designate the clutch, which is generally returned to engagement by a spring. When the operator acts on the pedal so as to release the clutch through link 104, the bell crank 102 is moved likewise, as seen in Fig. 3, moving bolt 97 to the unlocked position and the gear change is then made in the manner before described. While either of the rods 68, 69 are in an intermediate position so that their slots do not register with bolt 97, the bolt is prevented from returning to its locking position and the clutch is therefore prevented from reëngaging. No damage can therefore result to parts of the gearing by improper engagement of the clutch.

I claim:

1. In change-speed gearing the combination of a driving member, two driven gears, a pinion engaging one of said gears, another pinion engaging the other gear, and means including change speed gearing for connecting either of the pinions with the driving member directly, or for impelling said pinions selectively from the driving member at lower relative speeds.

2. In change-speed gearing the combination of a driving member, two driven gears of different diameters, a pinion engaging one of the gears, another pinion engaging the other gear, and means including reduction gearing for connecting either of the pinions with the driving member directly or for impelling either of the pinions from the driving member at lower relative speeds.

3. In change-speed gearing the combination of a driving member, two bevel gears of different diameters, pinions each engaging one of said gears and means including reduction gearing intermediate the driving member and pinions for impelling either of said pinions at the speed of the driving member or at a lower speed, selectively.

4. In change-speed gearing, the combination of a driving member, two bevel pinions, coaxial bevel gears engaging said pinions on the same side, and means for impelling either of said pinions at the same angular speed as the driving member or at a reduced speed in relation to that of the driving member, as desired.

5. In variable speed-gearing, the combination of a driving member, two normally free bevel pinions coaxial therewith, a shaft transverse to the axis of the pinions and in the same plane, bevel gears on the shaft connected to revolve together and engaging the pinions on the same side of the pinion-axis, and selective means for impelling the pinions selectively at the same speed as the driving member or at a reduced speed in relation to said member.

6. The combination of a driving shaft, a driven shaft coaxial therewith, an intermediate driven member revolubly mounted on said shafts, reduction gearing, a pinion fast on the driven shaft, a pinion loose thereon, and means for connecting the intermediate driven member with the driving member directly or through the reduction gearing and means for selectively connecting the driven shaft or the loose pinion with the intermediate driven member.

7. The combination of a driving shaft, two bevel pinions, a revoluble member intermediate the driving member and pinions, all parts foregoing having a common axis, means for impelling the intermediate member at the same or a reduced speed in relation to that of the driving member, and means for connecting the pinions with the intermediate member selectively.

8. The combination of a driving shaft, a driven shaft, a sleeve revolubly mounted on the adjacent ends of said shafts, a gear loose on the driven shaft, a counter-shaft rotated by the driving shaft, and means for selectively connecting the sleeve with the driving shaft or the counter-shaft and for selectively connecting the driven shaft or the loose gear with the sleeve.

9. The combination of a driving shaft, bevel pinions, a revoluble member intermediate the pinions and shaft, the foregoing elements having a common axis, a counter-shaft impelled by the driving shaft, a final driven shaft transverse the axis of the pinions and in the same plane, gears thereon engaging the pinions on the same side of the pinion-axis, and means for selectively connecting the pinions with the revoluble member but one at a time, and for connecting the revoluble member with the driving shaft or counter-shaft.

10. The combination of a driving shaft, a driven shaft coaxial therewith, a splined sleeve revolubly mounted on said shafts, a counter-shaft rotated by the driving shaft, a sliding member on the sleeve having clutch members for connecting it with the driving shaft and a gear for connecting it with the counter-shaft, bevel pinions, one fixed to the driven shaft and one loose thereon, a second sliding member on the sleeve having clutch members for connecting it with either of the pinions, and connected bevel gears engaging the pinions and mounted on a common axis transverse the axis of the pinions and in the same plane.

11. In change-speed gearing, the combination of two coaxial, revoluble bevel pinions having a common focus, a ball-thrust bearing intermediate them, a stationary support, and a ball-thrust bearing carried by the support behind the pinion farthest from the focus, and taking the thrust of both pinions.

12. The combination of a sleeve having a gear at one end and radial separated positive clutch members at the other end, and a thrust bearing member substantially in disk form, having a central hole and inwardly extending fingers capable of passing the clutch members and engaging the back of the gear.

13. The combination of a driving member, a driven member, two gears thereon, a pinion engaging one of said gears, another pinion engaging the other of said gears, reduction gearing and means for connecting either of said pinions with said driving member directly or for connecting said reduction gearing in the driving line between said driving member and said pinions for impelling the latter selectively at lower speeds.

14. The combination of two elements of gearing, an operating member connected with one element, another operating member connected with the other element, means for moving the operating members and a locking bolt constructed and arranged so that both operating members are either free to move or restrained from movement.

15. The combination of a clutch, two elements of gearing, an operating member connected to each element, means for moving the operating members, a locking bolt and means by which both operating means are restrained from movement when the clutch is engaged and are permitted to move when the clutch is disengaged.

16. The combination of a clutch, two elements of gearing, an operating member connected to each element, means for moving the operating members, a locking bolt, means by which both operating members are restrained from movement when the clutch is engaged and are permitted to move when the clutch is disengaged, and by which the clutch is prevented from engagement when either of the operating members is in certain positions.

17. In change-speed gearing the combination of a driving member, two driven gears mounted on the same axis at right angles to the driving member, pinions each engaging one of said gears, a revoluble member intermediate the driving member and pinions, reduction gearing, means for connecting said revoluble member with the driving member directly or with said reduction gearing and means for connecting said revoluble member with either of said pinions as desired.

18. In change-speed gearing the combination of a driving shaft, an axle arranged transversely thereto, two bevel gears on the axle having a common focus, bevel pinions each engaging one of said gears a revoluble connector coaxial with the driving shaft and pinions, a countershaft adjacent to the connector and gears thereon, a clutch for coupling the connector selectively with said pinions and a sliding member on the connector for coupling it with the driving member directly or to said countershaft gears as desired.

19. In gearing for motor vehicles, the combination of a gear box, a slidable gear element therein for effecting a certain speed combination, another movable element therein for effecting another certain speed combination, a controlling-lever shaft, a lever mounted upon said shaft and capable of rotative movement about the shaft axis and also capable of movement in the plane of the lever and said axis, a connection between the lever and one of said elements, such that the element is moved by the rotative motion of the lever and a connection between said lever and the other said element such that the element is moved by the movement of the lever in said plane.

20. In change-speed gearing for motor vehicles, the combination of a gear box, axially fixed rotatable gear shafts therein, a sliding gear element in said box whose movement effects a certain gear combination, another movable element in said box whose movement effects a different gear combination, a lever-shaft distinct from said gear shafts, a controlling lever mounted in relation to said lever-shaft so that said lever has rotative movement about the shaft axis and also has movement in the plane containing the lever and said axis, and means intermediate said lever and said elements by which the sliding gear element is moved by the rotative movement of the lever and the other said element is moved by the movement of the lever in said plane.

21. In change-speed gearing for motor vehicles, the combination of a gear box, axially fixed rotary gear shafts therein, a sliding gear element on one of said shafts for effecting a plurality of gear combinations, another movable element in said box for effecting a different gear combination, a lever-shaft distant from said gear shafts, a controlling lever mounted in relation to said lever-shaft for rotative movement about the shaft axis and for movement in the plane containing the lever and said axis, a connection between the lever and said sliding gear element, such that the rotative movement of the lever moves the element, a bell crank adjacent to said lever-shaft, means by which the movement of said lever in said plane and such movement only moves said bell crank and a connection between the bell crank and said other element in the gear box.

22. In change-speed gearing for motor vehicles, the combination of a gear box, gearing therein comprising axially fixed rotatable shafts, a slidable member on one of the shafts, said member including a gear for effecting one gear combination and a positive clutch for effecting another gear combination, another movable element in the gear box for effecting a third gear combination, a lever-shaft distant from the gear box, a pivotal mounting carried by the lever-shaft, a lever mounted on said pivot for movement in the plane of the lever and the shaft axis, the parts being constructed and arranged so that the lever is also movable rotatively about said axis, a connection between the lever and said sliding member such that the member is moved only by the rotative movement of the lever, a bell crank adjacent to said lever-shaft, a connection between the lever and the bell crank, such that the bell crank is moved only by movement of the lever in said plane and a connection between said bell crank and said movable element in the gear box.

23. In change-speed gearing for motor vehicles, the combination of a gear box, gearing therein comprising axially fixed rotatable shafts, a slidable member on one of the shafts, said member including a gear for effecting one gear combination and a positive clutch for effecting another gear combination, another movable element in the gear box for effecting a third gear combination, a lever-shaft distant from the gear box, a pivotal mounting carried by the lever-shaft immovably in the direction of the shaft-axis, a lever mounted on said pivot for movement in the plane of the lever and the shaft axis, the parts being constructed and arranged so that the lever is also movable rotatively about said shaft-axis, a connection between the lever and said sliding member such that the member is moved only by the rotative movement of the lever, a bell crank adjacent to said lever-shaft, a connection between the lever and the bell crank, such that the bell crank is moved by movement of the lever in said plane and is not affected by rotative movement of the lever, and a connection between said bell crank and said movable element in the gear box.

24. In change-speed gearing for motor-vehicles, the combination of a gear-box, a main shaft and a countershaft therein, a sliding gear-member on one of said shafts for effecting a certain gear-combination, another movable element in said box for effecting a different gear-combination, a lever-shaft distinct from the shafts aforesaid, a bearing in which said lever-shaft is rotatively mounted and fixed against end-motion, a pivot carried rigidly by said lever-shaft, a controlling lever mounted on said pivot to move laterally thereon and to move fore-and-aft by the rotation of said lever-shaft, a bell-crank adjacent to said lever-shaft and means by which only the lateral movement of said lever moves said bell-crank, a connection between said bell-crank and said movable element, and means by which only the fore-and-aft movement of said lever moves said sliding gear-member.

DEMPSTER M. SMITH.

Witnesses:
MARGARET SMITH,
E. B. RATCLIFFE.